US008610941B2

(12) United States Patent
Schneider et al.

(10) Patent No.: US 8,610,941 B2
(45) Date of Patent: Dec. 17, 2013

(54) METHOD FOR PRINTING PRINTED MATERIAL, WHICH IS INDIVIDUALIZED WITH LOGISTIC PRINT-IMAGE ELEMENTS

(75) Inventors: Josef Schneider, Diedorf (DE); Reinhard Baumann, Krailling (DE); Peer Dilling, Friedberg (DE); Robert Weiss, Gersthofen (DE)

(73) Assignee: manroland sheetfed GmbH, Offenbach/Main (DE)

( * ) Notice: Subject to any disclaimer, the term of this patent is extended or adjusted under 35 U.S.C. 154(b) by 1601 days.

(21) Appl. No.: 11/587,871

(22) PCT Filed: Apr. 30, 2004

(86) PCT No.: PCT/EP2004/004622

§ 371 (c)(1), (2), (4) Date: Feb. 8, 2007

(87) PCT Pub. No.: WO2005/115757

PCT Pub. Date: Dec. 8, 2005

(65) Prior Publication Data

US 2007/0245914 A1 Oct. 25, 2007

(51) Int. Cl.
*G06K 15/00* (2006.01)

(52) U.S. Cl.
USPC .......................................................... 358/1.18

(58) Field of Classification Search
USPC ......................................... 358/1.1, 1.15, 1.12
See application file for complete search history.

(56) References Cited

U.S. PATENT DOCUMENTS

| | | | | |
|---|---|---|---|---|
| 2002/0122205 | A1* | 9/2002 | Gauthier | 358/1.15 |
| 2003/0222127 | A1* | 12/2003 | Katz | 229/68.1 |
| 2005/0021404 | A1 | 1/2005 | Schoder et al. | |

FOREIGN PATENT DOCUMENTS

| | | |
|---|---|---|
| DE | 31 32 765 | 5/1983 |
| DE | 19512501 | 10/1996 |
| DE | 101 61 684 | 7/2003 |
| EP | 0 527 552 | 2/1993 |

OTHER PUBLICATIONS

Emeriau L.: "Personnaliser a Toute Vitesse La Personnalisation Jet D'Encre Couleur a Tres Haute Vitesse Est Desormais Possible Avec Le System Scitex 6240" Feb. 14, 1995, Caractere, CEP Information Profession. Paris, FR, pp. 32-34, XP000493504 ISSN: 0247-039X.

* cited by examiner

*Primary Examiner* — Jeremiah Bryar
(74) *Attorney, Agent, or Firm* — Cozen O'Connor

(57) ABSTRACT

The invention relates to a method for printing printed material which is individualized with logistical printed image elements, wherein at least one printed image, particularly a static printed image, which is printed in a printing machine, is individualized by technically adding at least one dynamic logistical printed image element. According to the invention, data of the/each dynamic logistical printed image element is combined in such a way that the/each printed image and the/each logistical printed image element are automatically updated by comparing data between a data bank provided by a print job user and a data bank provided by a logistics provider prior to printing the printed material individualized with the/each logistical printed image element.

10 Claims, 2 Drawing Sheets

METHOD FOR PRINTING PRINTED MATERIAL, WHICH IS INDIVIDUALIZED WITH LOGISTIC PRINT-IMAGE ELEMENTS

CROSS-REFERENCE TO RELATED APPLICATIONS

This is a U.S. national stage of application No. PCT/EP2004/004622, filed on 30 Apr. 2004.

BACKGROUND OF THE INVENTION

The invention relates to a process for printing printed matter individualized with logistic print-image elements where at least one print-image printed in a printing press is individualized by the use of technical means to add at least one dynamic logistic print element.

According to the prior art, the procedure according to which printed matter individualized with logistic print-image elements is printed, such as the procedure for printing prospectuses or advertising flyers individualized with addresses, is to print the "static" or never-changing print-image elements on the desired run of prospectuses in a printing press with at least one printing couple and then to individualize the prospectuses off-line on the basis of addresses provided by the print-job client. These addresses are the "dynamic" or variable logistic print-image elements.

The process according to the prior art for printing these types of materials individualized with addresses, for example, suffers from various disadvantages. For example, it is both complicated and expensive according to the prior art to individualize printed matter off-line with logistic print-image elements, especially with addresses. In addition, the data provided by the print-job customer for the variable logistic print-image elements may be out of date. In the case of addresses printed as logistic print-image elements, this would mean that printed matter such as prospectuses which have been individualized with addresses could be sent to addresses which are no longer current.

SUMMARY OF THE INVENTION

An object of the present invention is to provide a novel process for printing printed matter individualized with logistic print-image elements.

This object is accomplished by a process for printing printed matter individualized with logistic print-image elements in which data concerning the static print-image or each static print-image in particular are combined with data concerning the dynamic logistic print-image element or each such element in such a way that the print-image or each print-image and the logistic print-image element or each such element are printed in-line. Before the printed matter individualized with the logistic print-image element or with each such element is printed, the data concerning the logistic print-image element or each such element are for this purpose updated automatically according to the invention on the basis of a data comparison between a database provided by the print-job client and a database provided by a logistics provider.

BRIEF DESCRIPTION OF THE DRAWINGS

Exemplary embodiments of the invention are explained in greater detail below on the basis of the drawing, but the invention is not to be considered limited to them.

DETAILED DESCRIPTION OF THE PREFERRED EMBODIMENTS

Before the inventive process for printing printed matter individualized with logistic print-image elements is described in detail in the following with reference to FIG. 2, the known prior art process will be described first with reference to FIG. 1.

Figure 1:
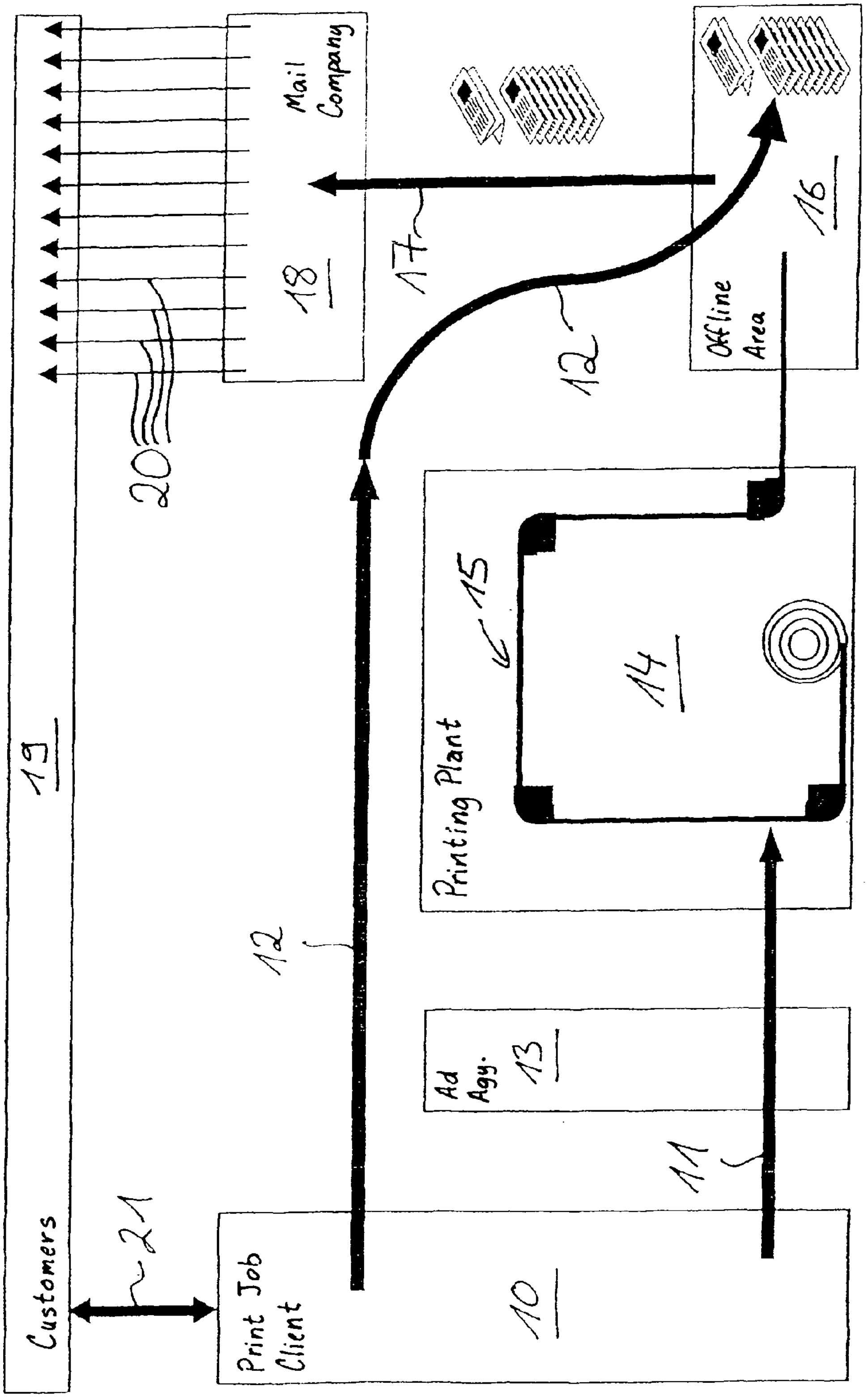
Prior Art Fig. 1
FIG. 1 is a schematic diagram illustrating a prior art process for printing printed matter individualized with logistic print-image elements.

FIG. 1 shows a schematic diagram which explains the known prior art process for printing printed matter individualized with logistic print-image elements. Thus, FIG. 1 visualizes in the form of block 10 a print-job client, who provides the data or databases necessary for printing printed matter individualized with logistic print-image elements. The data provided from block 10 consist of data 11 concerning the content, for example, of at least one static print-image for the printed matter to be produced and data 12 concerning the dynamic logistic print-image elements, which, in the exemplary embodiment under discussion here, are addresses, by means of which the static print-image or each static print-image of the printed matter is to be individualized.

According to the prior art as shown in FIG. 1, the data 11 concerning the static print-image or each static print-image of the printed matter to be printed are transmitted either directly or indirectly or via the intermediary of an advertising agency, visualized as block 13, to a printing plant, visualized by block 14. The advertising agency 13 can, for example, use the data 11 provided by the print-job client concerning the static print-image or each static print-image of the printed matter to be printed to generate a special layout. It is also possible, however, for this layout to be made available to the printing plant 14 directly by the print-job client.

The data 11 concerning the static print-image or each static print-image of the printed matter to be printed are converted in a preprinting stage to data which can be processed by a printing press 15, illustrated schematically in the figure. The printing press 15 usually has several printing couples set up in a row. If, for example, the printed matter to be printed is produced by autotype combination printing, then the printing press will preferably comprise at least four printing couples, where one printing couple is provided for each process color of the autotype combination process, namely, for each of the process colors cyan, magenta, yellow, and black. According to the prior art, the printed matter to be printed is printed with the never-changing and thus static print-images in the printing press 15, and the never-changing or static printed matter printed in the printing press 15 is then individualized off-line with the data 12 concerning the dynamic logistic print-image elements.

FIG. 1 shows, for example, that the never-changing and thus static printed matter printed in the printing press 15 is individualized off-line from the printing press 15 in a block 16 on the basis of the data 12 concerning the logistic print-image elements, namely, with the addresses, provided by the print-job client. This can be done, for example, in that, on the basis of the data 12, address labels are printed, which are then applied to the printed matter which has been printed in the printing press 15 and which is therefore still static up to this point. The static printed matter is thus individualized.

The printed matter thus individualized is then, as indicated by the arrow 17, sent to a logistics provider such as a mail company, for example, visualized by block 18, which then sends the printed matter individualized in block 16 to the addressees or customers, visualized in block 19, of the print-job client. It is standard practice according to the prior art, for example, for the logistics provider of block 18 to add logistics codes to the printed matter which has already been individualized with address labels, for example. For this purpose, the addresses applied to the printed matter for individualization are scanned by the logistics provider, and logistics codes are then generated by the logistics provider from these addresses. The codes are then also applied to the individualized printed matter. By the use of these logistics codes, it is possible to track the delivery status of the sent printed matter. The sending of the printed matter visualized with at least one logistic print-image element to the addressees or customers of the print-job client is visualized in FIG. 1 by the arrows 20.

The disadvantages from which the prior art suffers can be derived directly from the above-described prior art process for printing printed matter individualized with logistic print-image elements. According to the prior art, as previously mentioned, the never-changing and thus static printed matter is printed first in the printing press 15 on the basis of the data 11 concerning the static print-image element or each static print-image element; these products must then be individualized off-line in a separate work step on the basis of the data 12 concerning logistic print-image elements, especially addresses, provided by the print-job client. This is complicated and expensive. According to the prior art, furthermore, when it is necessary to track the delivery status of the printed matter which has been individualized in this way, the logistics provider must also generate separate logistics codes and apply them to the printed matter. This is also complicated and expensive. Another disadvantage of the process known from the prior art is that the last data exchange, visualized by the arrow 21, between the print-job client and the addressees to whom the printed matter is sent or the customers of the print-job client may have been relatively far back in the past, which means that the data 12 on some of the addressees provided by the print-job client may be out of date. To this extent, it cannot be excluded according to the prior art that the still static and thus never-changing printed matter is individualized in block 16 with out-of-date logistic print-image elements, especially with out-of-date addresses.

Figure 2:
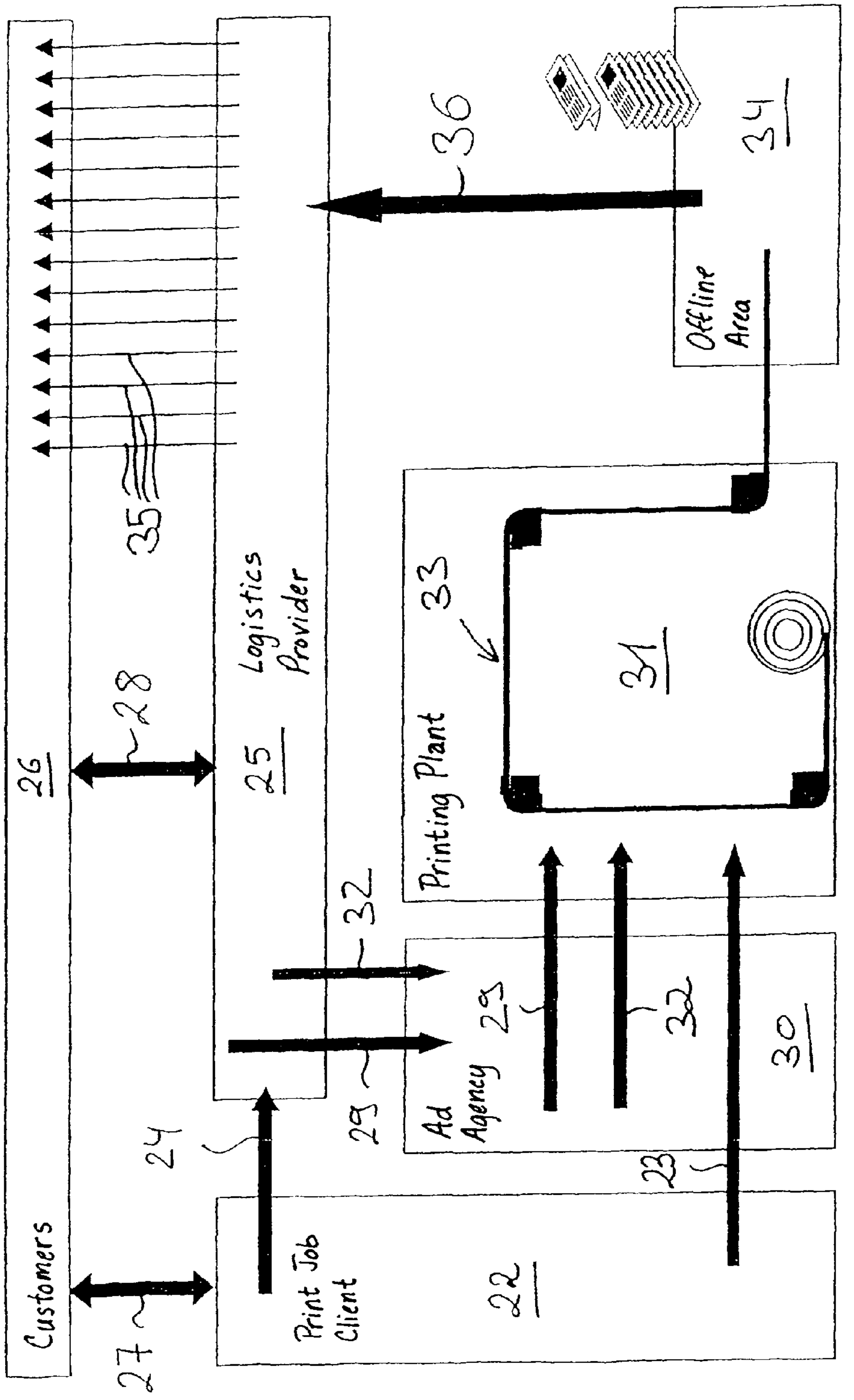
FIG. 2 is a schematic diagram illustrating an embodiment of the inventive process for printing printed matter individualized with logistic print-image elements.

FIG. 2 shows a schematic diagram which explains the inventive process for printing printed matter individualized with logistic print-image elements. Thus block 22 in FIG. 2 visualizes a print-job client, where again data 23 concerning the static print-image or each static print-image of the printed matter to be produced and data 24 concerning the dynamic logistic print-image elements, namely, addresses of the customers of the print-job client, are provided by the print-job client. According to the present invention, the data 23 concerning the static print-image or each static print-image are combined with the data 24 concerning the dynamic print-image element or each such element in such a way that the static print-image or each static print-image and the dynamic logistic print-image element or each such element are printed in-line. For this purpose, the following procedure is used.

According to a first aspect of the present invention, the data 24 concerning the dynamic logistic print-image elements, namely, the addresses of the customers of the print-job client, provided by the print-job client are compared with addresses provided by the logistics provider, represented in FIG. 2 by block 25. Thus, the addressees or customers, visualized by block 26 in FIG. 2, of the print-job client exchange data as shown by arrow 27 not only with the print-job client but also, as shown by arrow 28, with the logistics provider. The data exchange with the logistics provider, as shown by arrow 28, usually occurs at shorter intervals than the data exchange with the print-job client as shown by arrow 27, the reason for this being that the logistics provider collects relevant forwarding instructions and thus has more up-to-date addresses than the print-job client does.

Accordingly, the addresses to be printed as dynamic logistic print-image elements and used to individualize the printed matter are compared automatically and thus updated before printing by comparing the database provided by the print-job client with the address database provided by the logistics provider. In the exemplary embodiment of FIG. 2, these updated address data are made available to the advertising agency, visualized by block 30, which in turn makes these data 29 available to a printing plant, visualized by the block 31. It should be pointed out that the updated address data 29 can also be made available directly to the printing plant visualized by the block 31.

On the basis of the comparison between the address database provided by the print-job client and the address database provided by the logistics provider, furthermore, data 32 on updated logistics codes are also generated automatically. In the exemplary embodiment according to FIG. 2, these codes are also made available to the printing plant visualized by block 31 via the intermediary of the advertising agency, visualized by block 30.

According to another aspect of the present invention, a preprinting stage is carried out, in which the data 23 concerning the static print-image or each static print-image are combined with the data 29, 32 of the dynamic logistic print-image elements, namely, with the data 29 on updated addresses and the data 32 on updated logistics codes, in such a way that the static print-image or each static print-image and the dynamic logistic print-image element or each such element can be printed in-line, that is, in a single workflow.

Thus FIG. 2 shows again in highly schematic fashion a printing press 33. For the in-line printing of the static print-image or of each static print-image and the dynamic logistic print-image element or of each such element, this printing press 33 in the exemplary embodiment according to FIG. 2 has at least one printing couple for printing the static print-image or each static print-image and at least one printing device for printing the dynamic logistic print-image element or each such element, where the printing device or each printing device is installed in-line with the printing couple or each printing couple.

The printing couples for printing the static print-image or each static print-image are preferably offset printing couples or gravure printing couples or flexographic printing couples, where preferably one such printing couple is present for each color to be printed.

For the printing devices used to print the dynamic or variable logistic print-image elements, ink-jet printers are preferably used. It is also possible to use dynamic printing devices in place of such ink-jet printers, namely, devices based on the principle of electrophotography, magnetography, electrocoagulation, or even ionography.

The printing couple or each printing couple for printing the static print-image or each static print-image and the printing device or each printing device for printing the dynamic logistic print-image element or each such element are therefore, as previously mentioned, connected in-line to form a printing press 33, so that printed matter individualized with logistic print-image elements can be printed in a single workflow.

In accordance with the present invention, therefore, printed matter individualized with logistic print-image elements is printed in the printing press 33 in a single workflow and thus in-line, so that there is no need for the off-line individualization required according to the prior art. As a result, finished individualized printed matter is already present in block 34. This is then merely made available, as indicated by the arrow 36, to the logistics provider, visualized by the block 25, who, as shown by the arrows 35, sends the finished printed matter individualized with updated logistic print-image elements to the customers, visualized by the block 26, of the print-job client.

In summary, it should be remarked that the inventive process for printing printed matter individualized with logistic print-image elements is characterized essentially by two main aspects: According to the first main aspect, the static print-images and the dynamic logistic print-image elements are printed in-line, that is, in a single workflow. According to the second main aspect, the dynamic logistic print-image elements are updated automatically by comparing the databases with each other before the printed matter is printed.

What is involved here in particular is a comparison between an address database provided by the print-job client and an address database provided by the logistics provider. On the basis of this data comparison, it is possible to generate updated logistics codes, which are printed together with the updated addresses in-line with the static print-images. An especially preferred embodiment of the inventive process is obtained when, as in the exemplary embodiment according to FIG. 2, these two aspects are combined with each other.

What is claimed is:

1. A process for printing printed matter individualized with logistic print-image elements, the process comprising:

providing, by a print-job client, first data concerning at least one static print-image with second data concerning at least one dynamic logistic print-image;

combining the first data concerning at least one static print-image with the second data concerning at least one dynamic logistic print-image;

printing the at least one static print-image with the at least one logistic print-image element in line using the combined first and second data; and automatically updating the second data of the print-job client by comparing a database provided by the print-job client and a database provided by the logistics provider before said step of printing, wherein the print-job client and logistics provider are separate entities that receive the second data through separate data exchanges.

2. The process of claim 1, wherein the at least one dynamic logistic print-image element comprises a customer address or a logistics code.

3. The process of claim 2, wherein the at least one dynamic logistic print-image element comprises an address and said step of automatically updating comprises updating addresses to be printed as dynamic logistic print-image elements by a data comparison between an address database provided by the print-job client and an address database provided by the logistics provider.

4. The process of claim 3, wherein said step of updating the addresses comprises generating updated logistics codes based on the data comparison between an address database provided by the print-job client and an address database provided by the logistics provider.

5. The process of claim 1, wherein said step of printing is performed in a printing press.

6. The process of claim 1, wherein the at least one static print-image is generated in at least one printing couple of a printing press, and the at least one dynamic logistic print-image element is generated in at least one printing device of the printing press, wherein the at least one printing device is installed in-line with the at least one printing couple.

7. The process of claim 1, wherein offset printing couples, ink-jet printing couples, or flexographic printing couples are used to print the at least one static print-image.

8. The process of claim 1, wherein ink-jet printing devices are used to print the at least one dynamic logistic print-image element.

9. The process of claim 1, wherein printing devices based on the principle of electrophotography, magnetography, electrocoagulation, or ionography are used to print the at least one dynamic logistic print-image element.

10. The process of claim 1, wherein the data exchange with the logistics provider occurs at shorter intervals than the data exchange with the print-job client.

* * * * *